INVENTORS.
WILLARD E. KNAPP
WALTER M. BUSH
ROBERT H. GRIFFIN
BY
William C. Babcock
ATTORNEY

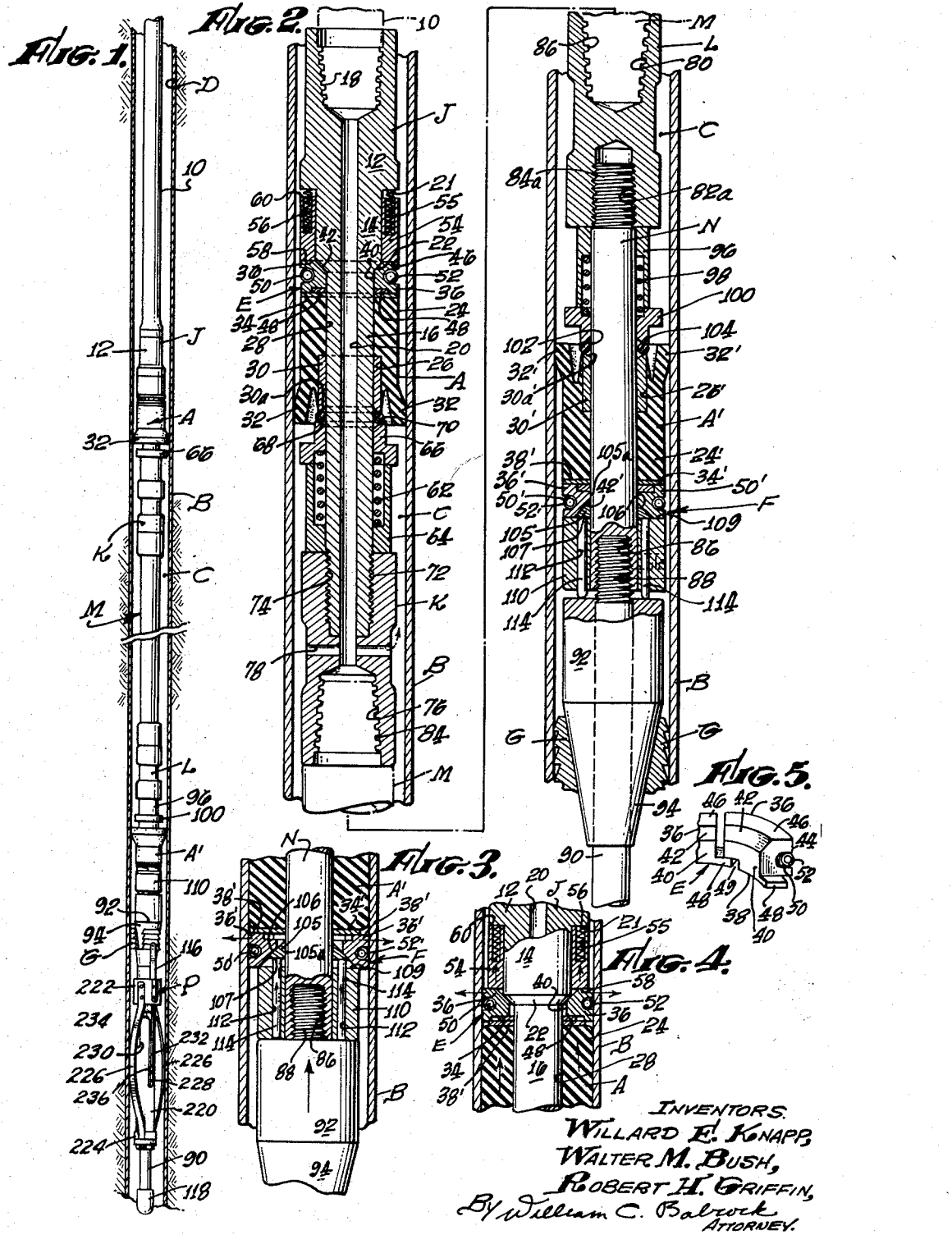

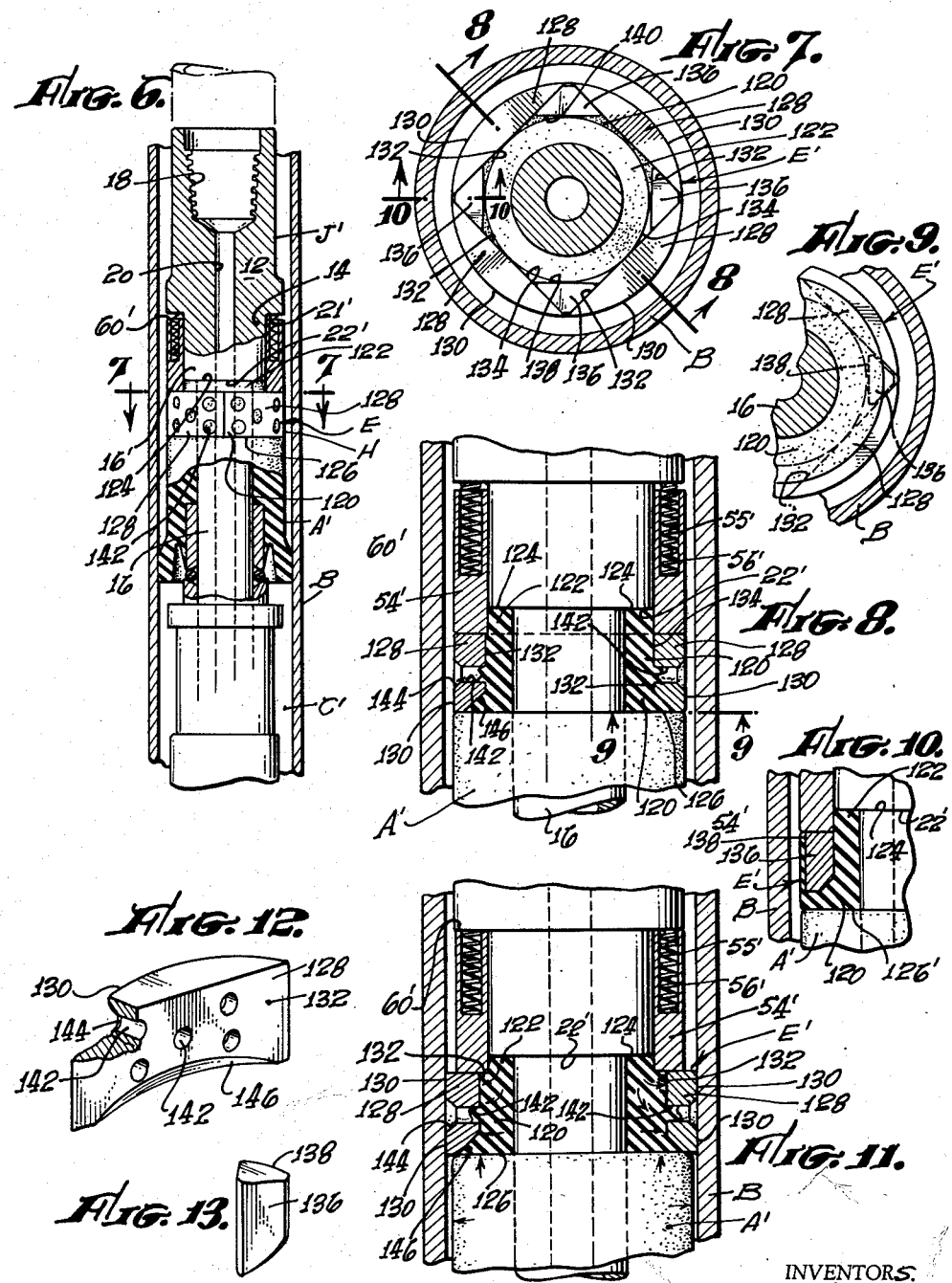

United States Patent Office 3,071,960
Patented Jan. 8, 1963

3,071,960
TUBULAR TESTING APPARATUS WITH EXPANDABLE BACK-UP MEMBERS AND METHOD OF USING SAME
Willard E. Knapp, 910 Terraine Ave., Long Beach, Calif.; Walter M. Bush, 9210 E. Cedar St., Bellflower, Calif.; and Robert H. Griffin, 4400 Heather Road, Long Beach, Calif.
Filed Dec. 29, 1958, Ser. No. 783,489
13 Claims. (Cl. 73—40.5)

The present invention relates generally to the field of hydraulic testing equipment, and more specifically to an apparatus for use in testing either a single length or a continuous sequence of lengths of pipe, casing or other tubular members, as well as the connecting joints therefor, and a method of carrying out the testing operation.

A major object of the present invention is to provide an apparatus for use in hydrostatically testing casing or other tubular members, preferably when disposed in a well bore, with this testing operation being accomplished under a fluid pressure in excess of that at which the resilient material forming the packers used in the operation start to cold-flow, creep or otherwise deform.

Another object of the invention is to supply an apparatus which includes two longitudinally spaced packers, together with the interior surface of the tubular member being tested to cooperatively define a confined space into which fluid at the desired pressure can be discharged for testing purposes, with the uppermost packer in the device having first back-up means associated therewith that automatically expand radially when the pressure to which the uppermost packer is subjected exceeds a predetermined maximum. The lower packer has second back-up means associated therewith that serve the same function as the first means but which are actuated by mechanical movement of the device prior to discharge of hydraulic fluid into the confined space to test the wall structure of the tubular member defining same.

Yet another object of the invention is to provide a hydrostatic testing apparatus that is easy to use, reduces the possibility of damage to the packers due to excessive pressures exerted thereon, and automatically provides transverse barriers to prevent cold-flow of the resilient material from which the packers are fabricated before it is possible to subject them to high, damaging hydrostatic pressures.

A still further object of the invention is to provide means and method for quick and convenient hydrostatic testing of tubular members when in place in a well bore, at higher pressures than heretofore employed, and with the invention being operable, due to the simple mechanical structure thereof, by personnel having little or no prior training or experience in this field.

These and other objects and advantages of the invention will become apparent from the following description of a preferred and an alternate form thereof, and from the drawings illustrating those forms in which:

FIGURE 1 is a combined elevational and vertical cross-sectional view of the invention shown disposed within the confines of a casing to be hydrostatically tested while located in a well bore;

FIGURE 2 is a vertical cross-sectional view of a preferred form of the invention disposed within a tubular member before the back-up means for the packers have been radially expanded to provide rigid transverse barriers;

FIGURE 3 is a fragmentary vertical cross-sectional view of a portion of the lowermost packer showing the back-up means associated therewith radially expanded in a barrier-forming position;

FIGURE 4 is a fragmentary vertical cross-sectional view of the uppermost packer showing the back-up means associated therewith radially expanded in a barrier-forming position;

FIGURE 5 is a perspective view of a portion of the preferred form of back-up members used with both the upper and lower packers;

FIGURE 6 is a fragmentary vertical cross-sectional view of the upper portion of the invention, with a first alternate form of back-up member associated with the uppermost packer which has not been radially expanded;

FIGURE 7 is a combined horizontal cross-sectional and top plan view of the first alternate back-up member taken on line 7—7 of FIGURE 6;

FIGURE 8 is a fragmentary enlarged vertical cross-sectional view of the first alternate form of back-up member taken on line 8—8 of FIGURE 7;

FIGURE 9 is a fragmentary bottom plan view of the first alternate form of back-up member taken on line 9—9 of FIGURE 8;

FIGURE 10 is a fragmentary vertical cross-sectional view of the first alternate form of back-up member taken on line 10—10 of FIGURE 7;

FIGURE 11 is a fragmentary vertical cross-sectional view of the uppermost packer and first alternate form of back-up member shown in a radially expanded position;

Figures 2A, 3A:
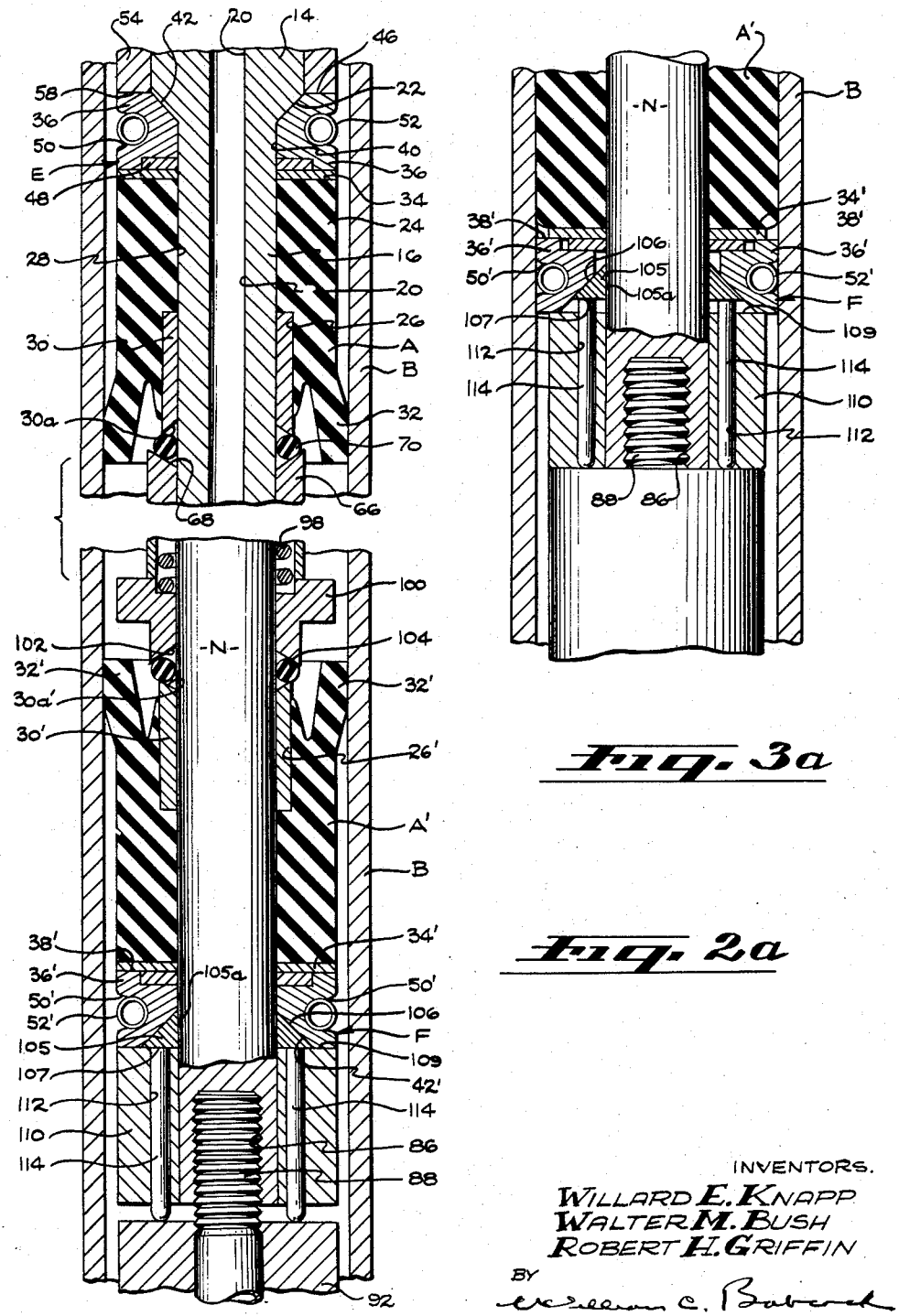
FIGURE 2a is a partial enlarged view showing elements of the apparatus in the position corresponding to FIGURE 2.
FIGURE 3a is a partial enlarged view showing elements of the apparatus in the position corresponding to FIGURE 3.

FIGURE 12 is a perspective view of one of the rigid metallic segments forming a part of the first alternate form of back-up member that are moved radially to contact the interior surface of the tubular member being tested; and FIGURE 13 is a perspective view of another form of rigid member forming a part of the first alternate form of the invention shown disposed between adjacent end portions of the segments shown in FIGURES 7, 9 and 10.

Referring to the drawings for the general arrangement of the invention, it will be seen in FIGURE 1 to include two resilient packers A and A' that sealingly engage the interior surface of casing or other tubular member B disposed in a bore hole D. Packers A and A' are so longitudinally spaced, by means to be described hereinafter, that together with the side wall of the casing B to be tested, an elongate confined space C is defined in the casing in which fluid under pressure can be discharged for hydrostatic testing purposes. The longitudinal spacing of packers A and A' can be varied to suit a particular testing job, as for instance, testing of individual lengths of casing, concurrent testing of multiple lengths of casing that are joined end-to-end, and individual joints between lengths of casing and portions of casing on each side thereof. While the invention is described and illustrated herein as utilized in connection with the hydrostatic testing of casing in a well bore, it is equally well adapted for use in the testing of other elongate tubular members such as tubing and the like.

The uppermost packer A shown in FIGURE 2 has a first back-up assembly E associated therewith that automatically expands radially to a rigid barrier-forming position when the hydrostatic pressure to which the packer is subjected exceeds a predetermined maximum. The expanded back-up assembly E prevents cold-flow of the resilient material from which packer A is fabricated when it is subjected to sufficient hydrostatic pressures to cause such flow.

A lower packer A' is also provided, together with a second back-up assembly F associated therewith (FIGURE 2), which is actuated to concurrently assume a transverse barrier-forming position with downward movement of the invention to set slips G forming a part thereof into gripping contact with the interior surface of casing B.

First back-up assembly E automatically retracts to the position shown in FIGURE 2 when the hydrostatic pressure in confined space C is permitted to drop below a predetermined minimum value. Second back-up assembly F automatically returns to a retracted position, as will hereinafter be explained, when a portion of the invention is raised relative to casing B to disengage slips G from gripping contact therewith.

A first alternate form of back-up assembly H is shown in FIGURES 6 to 13 inclusive, that is actuated by upward movement of packer A, which occurs as the hydrostatic pressure exerted on the end portion of packer A defining a part of confined space C increases. Assembly H performs the same function as assembly A.

The invention, as can be seen in FIGURE 1, is preferably affixed to the lower end of a rigid tubing string 10 that depends from the ground surface, and from a source of hydraulic fluid under pressure (not shown). In addition to supplying hydraulic fluid to space C, tubing string 10 also disposes the invention at a desired depth in casing B when moved vertically therein. Further vertical movement and manipulation of string 10 permits slips G to be set at the proper depth to removably lock the invention to the casing.

In detail, the invention includes an elongate tubular member J (FIGURE 1) comprising a tubular head portion 12, an intermediate tubular portion 14, and a tubular discharge portion 16. A tapped bore 18 is formed in head portion 12 which communicates with a longitudinal bore 20 that extends downwardly therefrom through portions 14 and 16. Bore 18 threadedly engages the lower threaded end of tubing string 10. Intermediate portion 14 is smaller in transverse cross section than head portion 12, but larger than that of discharge portion 16. At the junction between portion 12 and portion 16, portion 14 defines an upper circumferentially extending body shoulder 21, and a lower circumferential body shoulder 22 that tapers inwardly toward portion 16.

Packer A (FIGURE 2) includes a cylindrical body 24 in which a longitudinal bore 26 and counterbore 28 are formed. Bore 26 has a cylindrical rigid sleeve 30 mounted therein, the lower edge 30a of which tapers upwardly and inwardly. A cylindrical flange 32 depends downwardly from body 24. Flange 32 is at all times in pressure and fluid-sealing contact with the interior surface of casing B. Tubular discharge portion 16 extends downwardly through counter bore 28 and sleeve 30 to snugly but slidably engage the interior wall surfaces defined by the counterbore 28 and sleeve 30. The top of body 24 terminates in a flat, ring-shaped surface on which a rigid ring-shaped first pressure plate 34 rests. Plate 34 supports the back-up assembly E that is comprised of a sufficient number of arcuate segments 36 of tongue and groove structure to encircle discharge portion 16 adjacent to shoulder 22.

Each segment 36 (FIGURE 5) has a lower curving flat face 38 from the inner edge of which a first face 40 extends upwardly. Face 40 is of such configuration as to snugly abut against an external surface section of discharge portion 16. The upper edge of face 40 develops into a second curved upwardly and outwardly tapering face 42 that is complementary to shoulder 22 and in slidable contact therewith. The outer edge of face 40 develops into a third upwardly extending surface 44 of substantially the same transverse radius of curvature as the interior surface of casing B being tested. The upper edges of surfaces 42 and 44 have a fourth surface 46 extending therebetween. Each of the segments 36 has an arcuate tongue 48 projecting from one end thereof which has the same radius of curvature as the supporting segment, and a groove 49 is formed in the opposite lower end portion of the segment. When segments 36 are arranged in the circular pattern partially shown in FIGURE 5, the tongues 48 and grooves 49 are in slidable engagement, and when so disposed, encircle intermediate member 16 as illustrated in FIGURE 2. When arranged in this encircling position the lower surfaces of segments 36, as well as the lower surfaces of tongues 48 are slidably supported on the upper face of plate 34. A circumferentially extending groove 50 is formed in each of the third surfaces 44, and these grooves are engaged by a tensioned resilient band 52 that serves to hold the segments in the encircling position about tubular member discharge portion 16 (FIGURE 2).

A cylindrical rigid back-up member 54 which is shorter than intermediate portion 14, is slidably mounted thereon. Member 54 has a number of circumferentially spaced, downwardly extending cavities 55 formed therein in which compressed helical springs 56 are positioned. The upper ends of springs 56 abut against first body shoulder 21, and tend at all times to maintain the lower edge 58 of member 54 in contact with the fourth faces 46 of segments 36. Springs 56 likewise at all times tend to maintain the upper edge 60 of member 54 and first body shoulder 21 in longitudinally spaced relationship.

A compressed helical spring 62 encircles tubular member discharge portion 16 (FIGURE 2) and is enclosed within a housing 64 that is slidably mounted on discharge portion 16. Spring 62 projects upwardly through an upper open end of housing 64 to at all times urge a thimble 66, also slidably mounted on discharge portion 16, toward sleeve 30. The upper circumferential edge surface 68 of thimble 66 tapers downwardly and inwardly. A resilient sealing ring 70 encircles discharge portion 16 and is positioned between tapered surfaces 30a and 68. Due to the spring loading on thimble 66, the sealing ring 70 is compressed between surfaces 30a and 68, and urged inwardly at all times into pressure fluid sealing contact with tubular member discharge portion 16.

Threads 72 are formed on the lower end of discharge portion 16. A first rigid tubular connector K (FIGURE 2) is so formed as to provide upper and lower oppositely disposed tapped bores 74 and 76, with bore 74 communicating with a fluid discharge passage 78 also formed in the connector that extends substantially transversely. Bore 74 is engaged by threads 72 to support connector K from discharge portion 16. A second tubular connector L is longitudinally spaced below connector K. An upwardly extending tapped recess 80 and an oppositely disposed downwardly extending tapped recess 82 are formed in connector L.

A first elongate rigid spacer M is provided that has an upper threaded end 84 and a lower threaded end 86. Ends 84 and 86 threadedly engage tapped recesses 76 and 80 respectively, to hold the second connector in desired longitudinal spacing from the first connector.

From the above description it will be seen that when fluid is discharged into confined space C, the pressure on this fluid increases and a sufficient upward force is exerted on packer A to cause it to move upwardly on tubular member discharge portion 16. Such upward movement can only occur if upward sliding movement of faces 42 of segments 36 relative to tapered body shoulder 22 takes place concurrently with radial outward movement of segments 36 relative to discharge portion 16 until this radial movement is halted by ring 70 when brought into abutment with the interior surface of casing B. The length of back-up member 54 is such that as combined upward and radial movement of segments 36 occurs, the back-up member is moved upwardly toward first shoulder 21, and the upper end of back-up member 54 just contacts the first shoulder as segments 36 assume an expanded transverse barrier-forming position. The expanded position assumed by segments 36 when reinforced against longitudinal movement by back-up member 54 in abutting contact with shoulder 21, is sufficient to prevent cold-flow of the resilient material when packer A is subjected to a high hydrostatic pressure which normally would cause such flow to permanently deform and damage the packer.

Tapped recess 82a of second connector L is engaged by threads 84a formed on the upper end of a second elongate spacer N. A tapped recess 86 extends upwardly in spacer N from the lower end surface thereof, and this recess is engaged by a threaded end portion 88 of a rod 90. Rod 90 slidably supports a mandrel 92 which defines a downwardly and inwardly tapering conical face 94 that is adapted to slidably engage the interior surfaces of slips G.

Packer A' is identical in size and structure to packer A, but is oppositely disposed and slidably mounted on spacer N relative to packer A. The same numerals used in identifying components comprising packer A are used in denoting similar components of packer A', but with a prime affixed thereto. A second ring-shaped pressure plate 34' which has second spacer N extending therethrough, abuts against the lower flat surface of packer A'. The second back-up assembly F is composed of segments 36' that are structurally identical to segments 36 previously described, but disposed in inverted position. Segments 36' encircle spacer N and their faces 38' are in sliding contact with second pressure plate 34'. Segments 36' are held in an encircling and contacting position on second spacer N by means of a second resilient ring 52' disposed in grooves 50'.

A cylindrical housing 96 having a lower open end is slidably mounted on second spacer N. A compressed helical spring 98 encircles second spacer N and is positioned within housing 96. The lower end of spring 98 abuts against a thimble 100 that is slidably mounted on spacer N, and the lower circumferential end surface 102 of this thimble tapers upwardly and inwardly. Surface 102 bears against a resilient ring 104 that also engages a tapered ring-shaped surface 30a' of sleeve 30' as shown in FIGURE 2, and the ring is forced inwardly at all times into fluid-sealing contact with second spacer N, due to the force exerted by spring 98.

A rigid ring 105 is provided that is formed with a flat cylindrical surface 105a that slidably encircles second spacer N, a second circumferentially extending face that slopes downwardly and outwardly from surface 105a, and a flat under face 107 which extends outwardly from the lower edge of surface 105a to meet face 106 in a circumferentially extending apex. Second surfaces 42' of segments 36', as best seen in FIGURE 2, are in slidable engagement with face 106. Face 107 rests on an upper surface 109 of a collar 110 that is rigidly affixed to spacer N. Collar 110 has a number of circumferentially spaced bores 112 extending the length thereof in which pins 114 are slidably supported. Pins 114 are longer than the bores 112 in which they are mounted in order to cause radial movement of segments 36', as will be described in detail hereinafter.

Slips G, as seen in FIGURE 1, are rigidly affixed to a number of elongate resilient members or springs 116 that extend downwardly to the upper end portion of a bow spring assembly P which is slidably mounted on rod 90. The lower end of rod 90 is preferably threaded and is engaged by an internally threaded cap 118 that serves to prevent inadvertent disengagement of the bow spring assembly from the rod.

Assembly P includes an elongate tubular sleeve 220 slidably mounted on rod 90, with the sleeve supporting collars 222 and 224 on the ends thereof. The bow spring 226, which slidably, but frictionally contacts the interior surface of casing B at all times, has the ends thereof riveted or other wise rigidly affixed to the collars. An inverted J-shaped slot 228 is formed in sleeve 220 and is defined by first and second laterally spaced vertical legs 230 and 232, respectively. The upper ends of these two legs are connected by a transverse passage 234. Leg 232 (FIGURE 1) is substantially longer than leg 230. A pin 236 is affixed to rod 90 and projects outwardly therefrom to at all times slidably engage slot 228.

When the invention is being run downwardly in casing B to a position where the testing operation is to take place, pin 236 is disposed in first leg 230, and due to the frictional engagement of springs 226 with the interior surface of the casing, this pin bears against the lower edge thereof. Due to such engagement of pin 236 with the lower edge of first leg 230, upward movement of spring assembly P relative to rod 90 is prevented to the extent that slips G will be set by sliding upward contact relative to mandrel face 94.

After the invention has been lowered in casing B to a depth where it is desired to hydrostatically test the casing, the tubing string 10 is lifted upwardly to place pin 236 in one end of passage 234. Thereafter, the tubing string is rotated in the appropriate direction to cause pin 236 to traverse the length of the passage, and the tubing string is then lowered to cause downward movement of the pin into slot 232.

Downward movement of pin 236 in slot 232 permits downward movement of tapered mandrel face 94 relative to slips G to radially move the slips into pressure-gripping contact with the interior surface of casing B to support the invention therefrom and in fixed position relative thereto. Continued downward movement of tubing 10 after the slips have so pressure contacted casing B can only be in conjunction with the entire assembly of the invention above mandrel 92 and relative thereto, with the exception of ring 105 and pins 114. Such downward movement causes segments 36' to move downwardly and outwardly from the position shown in FIGURE 2 to the expanded position shown in FIGURE 3 where they provide a transverse barrier and restrain cold-flow of the resilient material defining packer A' when it is subjected to high hydrostatic pressure by fluid discharged into confined space C as previously described in detail. Both the slips G and backup segments 36' retract to the positions shown in FIGURE 2 when tubing string 10 is drawn upwardly.

The first alternate form of the invention is shown in FIGURES 6–13 inclusive, and operates in the same manner as the preferred form but differs therefrom structurally in that the lower body shoulder 22' (FIGURE 6) of this alternate form defines a flat, ring-shaped surface rather than being tapered. Due to the similarity in structure between these two forms, the same numerals are used to identify corresponding components comprising the first alternate form, but with a prime added thereto.

The construction of back-up assembly E' is completely different from that of back-up assembly E, as may be readily seen in FIGURES 6–11. The radially movable portion of assembly E' comprises a body 120 which is generally octagonal in transverse cross section and has a boss 122 of ring-shaped, but smaller transverse cross section projecting upwardly therefrom. Body 120 is formed of a resilient material such as rubber, or the like, slidably mounted on tubular discharge portion 16'. The upper ring-shaped surface 124 of boss 122 abuts against the lower body shoulder 22', and the lower surface 126 of body 120 rests on the flat upper surface of packer A'.

A number of arcuate segments 128 (FIGURE 7) are provided that are fabricated from a rigid material, each of which has a curved outer face 130 of substantially the same radius of curvature as the interior surface of casing B, and a flat interior surface 132 that abuts against one of the exterior surfaces 134 of body 120. A plurality of rigid separating members 136 are also provided that are trapezoidal in transverse cross section, each of which has a flat surface 138 that abuts against a surface 140 of body 120. Segments 128 and members 136 are of substantially the same height as shown in FIGURES 12 and 13. A number of bores 142 extend transversely through each segment 128, the outermost ends of which bores develop into enlarged, inwardly tapering countersunk portions 144. Each body 120 has four segments 128 and four members 136 bonded to the exterior surface thereof (FIGURES 7 and 9), and the resilient material of the body extends through the countersunk bores to further augment bonding of the sectors to the body.

In order for the segments 128 and members 136 to effect a completely closed barrier when body 120 is radially expanded, the bore-contacting surfaces of these members must lie appreciably back from the position shown in FIGURE 7. The spacing between the bore wall and the back-up element in FIGURE 7 is exaggerated without exaggerating the relative dimensions between segments 128 and members 136.

As fluid under pressure is admitted into the confined space C' in the manner described in conjunction with the preferred form of the invention, packer A tends to move upwardly on tubular discharge portion 16'. Upward movement of packer A longitudinally compresses boss 122 and that portion of body 120 situated therebelow, and concurrently effects radial expansion of body 120 which forces segments 128 and members 136 into the packer back-up position shown in FIGURE 11, to prevent the cold-flow of the resilient material of the packer. It will be particularly noted in FIGURE 11 that concurrent longitudinal movement of the segments 128 and members 136 with the radial expansion thereof is prevented, for they are in abutment with the lower face of the rigid back-up member 54'.

Therefore, longitudinal compression of body 120 and boss 122 can only result in outward radial expansion of body 120, until further radial expansion is terminated by segments 128 and members 136 are brought into abutting contact with the interior surface of casing C. Upward movement of packer A not only results in radial expansion of body 120 as described, but the thickness of the body is also lessened to the extent that segments 128 and members 136 move upwardly relative to tubular discharge portion 16' to place the upper faces of the sectors and members in abutting contact with member 54' which has also moved upwardly to place edge 60' thereof in contact with upper shoulder 12'.

The rigid segments 128 and members 136, together with member 54', cooperatively provide a ring-shaped, transversely extending barrier that prevents cold-flow of the edge portions of packer A when the packer is subjected to high hydrostatic pressures. Of course, when hydrostatic pressure in confined space C is terminated or reduced below a predetermined magnitude, springs 56' and the resiliency of body 120 cause the first alternate form of back-up member to assume the position shown in FIGURE 6.

Should it be desired, each segment 128 can be formed with a surface 146 that tapers upwardly and inwardly from the lower edge of face 130 to the lower edge of face 132. Surfaces 146 cause the radially expanding body 120 to not only move sectors 128 radially, but impart an upwardly and outwardly directed component of force thereto.

Operation of the first alternate form of the invention is precisely the same as the preferred form thereof, and need not be repeated.

The method of testing any desired longitudinally extending portion of a continuous, substantially vertically disposed tubular member at any desired pressure is extremely simple, and can be carried out equally well if the tubular member is one or formed from a number of lengths that are joined in end-to-end sequence.

Either the preferred form of the invention shown in FIGURES 1–5 inclusive, or the first alternate form thereof shown in FIGURES 6–13 inclusive, is first made up by the use of spacers M and N to longitudinally space packers A and A' the same distance apart as the length of that portion of casing D to be tested. When so made up the invention is lowered into casing D by means of tubing string 10, with pin 236 disposed in leg 228, until packers A and A' are so positioned as to cooperate with the portion of casing D to be tested as to define a confined space C, as shown in FIGURE 1.

Tubing string 10 is then manipulated from the ground surface as previously explained herein, to move pin 236 upwardly in leg 230, through passage 234, and downwardly in leg 232. Such downward movement of pin 236 in leg 232 allows downward movement of mandrel 92 relative to slips G to cause same to expand into gripping contact with the interior surface of casing D. Continued downward movement of the balance of the invention above mandrel 92, except for ring 105 and rods 114, results in expansion of the second barrier-forming assembly F from a first position shown in FIGURE 2 to a second position disclosed in FIGURE 3 where the assembly prevents the cold-flow of the resilient material forming packer A' when it is subjected to a high pressure.

Hydraulic fluid is thereafter discharged into confined space C from the ground surface through tubing string 10 and member J. The pressure on the fluid in space C may be built up to any desired magnitude, for as the pressure increases, the barrier-forming assembly E or E' is transversely expanded by upward movement of packer A. This expansion of assembly E or E' from a first to a second position is completed prior to the fluid pressure reaching a magnitude that would normally cause cold-flow of the resilient material from which packer A is fabricated. Indicating means (not shown) are watched during the testing operation to ascertain whether the fluid pressure drops. Any decrease in fluid pressure indicates that fluid is escaping through the side wall of casing D and that length under test is not satisfactory.

Upon completion of the testing operation, pressure is removed from the fluid in space C and the assembly E or E', as previously described, returns to the first position shown in FIGURES 2 and 6, respectively. Barrier-forming assembly F can be moved from the second to the first position by simply moving the tubing string 10 upwardly.

It will be apparent that variations may be made in both the structure of the invention and to the use to which it may be put. For instance, the segments 36 shown in FIGURE 5 could conceivably be made from a hard material other than metal. Likewise, the packer constructions shown in FIGURES 3 to 13 inclusive could be used to obstruct a cavity, bore hole, or the like. When so used they would prevent the cold flow of rubber or other resilient material. Although the method of using the invention contemplates testing of tubular members in a bore hole, the invention could be used equally well in the testing thereof when the tubular members are withdrawn from the bore hole and disposed above the ground surface.

It will be obvious to those skilled in the art that the above and other changes may be made in the invention and method of using same without departing from the spirit and scope thereof, and therefore the invention is not limited by that which is shown in the drawing and described in the specification, but only as indicated in the appended claims.

We claim:

1. Apparatus adapted to be connected to a tubular string for hydraulically testing a tubular member disposed in a well bore at any desired pressure, including: an elongate body supported from the end of said string; a first upper packer and a second lower packer supported in longitudinally spaced relationship on said body for sealing with the interior surface of said tubular member, said body having passage means formed therein for conducting fluid from said string to the space between said packers, said packers being formed of a resilient material that cold-flows above a predetermined pressure, said first packer being longitudinally movable relative to said body, with said second packer being held at a fixed position thereon; first radially expandable back-up means mounted on said body above said first packer, said first back-up means normally being separated from the interior surface of said tubular member by an annulus-shaped space; means for radially expanding said first back-up means into contact with the interior surface of said tubular member when the fluid in said space between said packers is subjected to a pressure greater than said predetermined pressure; a plurality of arcuate segments of tongue and groove construction that encircle said body below said second packer, which segments have downwardly extending cam faces formed thereon; a pressure plate that abuts against the lower end of said second packer and is slidably contacted by said segments; a ring that is slidably mounted on said body below said segments, said ring having an upwardly and inwardly extending cam face that slidably contacts said cam faces on said segments; a first rod projecting downwardly from said body; and a bow spring assembly slidably mounted on said rod that frictionally engages the interior surface of said tubular member to tend at all times to remain stationary relative thereto, a tapered mandrel slidably supported on said rod, a plurality of laterally movable slips supported from said assembly in slidable contact with said mandrel, a collar affixed to said body, a plurality of second rods of greater length than the length of said collar slidably supported thereby with the upper ends of said second rods in contact with said ring and the lower ends of said second rods which are in contact with said mandrel, with said first rod and mandrel when moved downwardly relative to said spring assembly and slips causing said slips to move radially into griping engagement with the interior surface of said tubular member to prevent further downward movement of said mandrel, and with continued downward movement of said body and said first rod causing downward movement of said ring relative to said segments to radially expand said segments into contact with the interior surface of said tubular member to back up said second lower packer.

2. A device as defined in claim 1 in which means are provided to prevent relative movement between said first rod and spring assembly, and between said slips and mandrel, until said device has been disposed at a desired elevation in said tubular member.

3. A device for use in so movably supporting substantially identical first and second resilient packers formed with cylindrical bodies in spaced and oppositely disposed relationship within the interor of a tubular member and in slidable fluid-sealing contact with the interior surface thereof to define a confined space into which a fluid can be discharged to test the wall surface of said tubular member between said packers at a pressure in excess of that at which said resilient material forming said packers starts to cold-flow, including: an elongate tubular member formed with an elongate head portion, an intermediate portion, and a discharge portion that are progressively smaller in transverse cross section, with first and second circumferentially extending ring-shaped externally shoulder surfaces being formed at the junctions of said intermediate portion with said head portion and discharge portion respectively, and said discharge portion extending through a longitudinally extending bore formed in said first packer to slidably support said first packer thereon; first and second elongate rigid spacers; first and second tubular connectors, said first connector affixed to an end portion of said first spacer and the free end of said discharge portion, said first connector being formed with a fluid discharge passage that is in communication with said confined space and the interior of said discharge portion, with said second connector removably joining adjacent ends of said first and second spacers, and said second spacer extending through a longitudinally extending bore formed in said second packer; first and second fluid sealing means that seal said first and second packers when mounted on said tubular member discharge portion and said second spacer; first back-up means disposed between said first packer and said intermediate portion that radially expand automatically to provide a rigid transverse barrier to prevent cold-flow of said resilient material forming said first packer thereby when said first packer moves toward said head portion due to fluid pressure in said confined space; a rigid rod connected to the free end of said second spacer and coaxially aligned therewith; a plurality of slips; a bow spring assembly slidably mounted on said rod and which frictionally engages the interior surface of said tubular member and at all times tends to resist movement relative thereto; a tapered mandrel slidably mounted on said rod; spring means affixed to said slips that support said slips from said assembly and permit said slips to move laterally into gripping engagement with the interior surface of said tubular member being tested when said rod and second spacer are moved relative to said mandrel a predetermined distance; second back-up means disposed between said second packer and mandrel that are radially expanded to provide a rigid transverse barrier to prevent cold-flow of said resilient material forming said second packer by continued movement of said second spacer after said second spacer has been moved sufficiently to set said slips; tubular means connectable to said head and to a source of hydraulic fluid under pressure to supply fluid to said confined space; and means to prevent said bow spring assembly having said rod moved relative thereto a sufficient distance to set said slips until said device has been disposed at a desired position in said tubular member that is to be tested.

4. A device as defined in claim 3 in which said first back-up means includes a ring shaped member at least partially defined by a resilient material through which said first tubular member discharge portion extends, with one transversely disposed face of said ring shaped member in contact with said second shoulder surface and the other transversely disposed face of said ring shaped member abutting against the end surface of said first packer opposite that which defines one end of said confined space, and said ring shaped member being radially expanded to said barrier forming position by compression placed thereon as said first packer moves towards said head portion.

5. A device as defined in claim 3 in which said first back-up means includes a generally ring shaped member defined by an interior core of a resilient material to which a plurality of rigid arcuate shaped segments are affixed to substantially define a cylindrical external surface, with one transversely disposed face of said core in contact with said second shoulder surface and the other transversely disposed face of said core abutting against the end surface of said first packer opposite that which defines one end of said confined space, and said core being radially expanded to cause it and said segments to assume said barrier forming position by said core being compressed as said first packer moves towards said head position.

6. A device as defined in claim 3 in which said first back-up means includes a generally ring shaped member defined by an interior core of a resilient material to which a plurality of rigid arcuate shaped segments are bonded in circumferentially spaced relationship together with a plurality of rigid members of generally triangular transverse cross section, each of said rigid members having an apex portion disposed between the adjoining end portions of two of said segments, said rigid members and segments cooperating to define a cylindrical enveloping sheath about said core, with one transversely disposed face of said core in contact with said second shoulder surface and the other transversely disposed face of said core abutting against the end surface of said first packer opposite that which defines one end of said confined space core being radially expanded to cause it, said segments, and said members, to assume said barrier forming position by said core being compressed as said first packer moves toward said head portion.

7. A device as defined in claim 3 wherein said second shoulder surface tapers inwardly toward said tubular member discharge portion, a first ring shaped pressure plate provided that rests on the end surface of said first packer opposite that end thereof that defines an end of said confined space, and said first back-up means is a plurality of rigid arcuate segments, each of which is formed with a flat face that slidably rests on said plate, said flat face on the edge thereof most adjacent said member discharge tubular portion developing into a first curved face that normally contacts an external surface section of said tubular member discharge portion with said first face developing into a second tapered curved face that is complementary to said second shoulder surface, and said flat face on the outer circumferential edge thereof developing into a third curved face parallel to said first face and in which a circumferentially extending groove is formed the most adjacent edges of said second and third faces having a fourth face extending therebetween that is parallel to said first face, with a first resilient ring being provided that seats in said grooves to hold said segments in an encircling position about said tubular member discharge portion, and said segments and ring moving outwardly to said barrier forming position by relative movement between said second faces and said second shoulder surface as said first packer moves toward said head portion.

8. A device as defined in claim 4 wherein said first radial movement restraining means is a cylindrical shell slidably mounted on said intermediate tubular portion, and spring means are provided that bear against said first ring shaped surface and a portion of said shell to at all times urge one end edge portion of said shell into contact with said resilient ring-shaped member and the opposite end edge portion of said shell separated from said first face, with the strength of said spring means being such that in cooperation with the resiliency of said material defining said ring-shaped member said cylindrical shell can only move toward said head to permit radial movement of said resilient ring-shaped member to said barrier forming position except when said first packer is moved toward said head by the application of hydrostatic pressure thereon by fluid disposed in said tubular member being tested.

9. A device as defined in claim 4 wherein a tapered ring-shaped member is provided that encircles said second spacer and has a circumferentially extending first face that tapers outwardly from said second spacer toward said body, a second ring-shaped pressure plate has said second spacer extending therethrough and abuts against the end of said second packer opposite that from which said flange extends, and said second back-up means is a plurality of rigid arcuate segments, each of said flat segments formed with a flat face that slidably rests on said second plate, said flat face on the edge thereof most adjacent said second spacer developing into a first curved face that normally contacts an external surface section of said second spacer, with said first face developing into a second tapered curved surface that is complementary to said first tapered face of said ring-shaped member, and said flat face on the outer circumferential edge thereof developing into a third curved face parallel to said first curved face and in which a circumferentially extending groove is formed, with a first resilient ring being provided that seats in said groove to hold said segments in an encircling position about said first tubular portion, and said segments and ring moving outwardly to said barrier forming position by relative movement between said second face and said first face of said ring-shaped member as said second packer moves toward said body.

10. Means for forming a transverse barrier between a tubular body having a circumferential axial shoulder and a cylindrical wall, comprising: a cylindrical core of a resilient material that has a first flat transverse end surface, said core being mounted on said body, with said first end surface abutting against said shoulder, which core has a diameter of less than the interior diameter of said wall; a plurality of rigid arcuate segments embedded in said core and disposed end-to-end to extend circumferentially therearound, said segments being of lesser thickness than the height of said core; and a plurality of rigid members embedded in said core, with each of said members having a portion of generally trapezoidal transverse cross section, which rigid members each have a wall portion disposed between the adjoining end portions of two of said segments and in contact therewith, said rigid members and segments cooperatively defining a cylindrical sheath on said core, with said sheath when said core is compressed by a longitudinally directed force towards said shoulder expanding radially due to the outward deformation of said core until further radial expansion is prevented by said segments and members contacting said wall, and said segments and members when so contacting said wall providing said barrier.

11. Means for forming a transverse barrier as defined in claim 10 wherein the dimensions of said segments and said members are such that said members and segments continue to be in contact with one another during the time and after said core has been expanded to place said segments and members in contact with the interior surface of said well.

12. Means for forming a transverse barrier as defined in claim 11 wherein at least said members are formed with upwardly and inwardly extending lower surfaces.

13. Means for forming a transverse barrier as defined in claim 11 wherein each of said segments has at least one inwardly tapering transverse bore formed therein, which bore is filled with said resilient material that defines said core.

References Cited in the file of this patent

UNITED STATES PATENTS

| | | |
|---|---|---|
| 2,248,169 | Granger | July 8, 1941 |
| 2,555,647 | King | June 5, 1951 |
| 2,618,340 | Lynd | Nov. 18, 1952 |
| 2,726,722 | Baker | Dec. 13, 1955 |
| 2,767,795 | Bush | Oct. 23, 1956 |
| 2,793,524 | Badger | May 28, 1957 |
| 2,797,758 | Showalter | July 2, 1957 |
| 2,807,955 | Loomis | Oct. 1, 1957 |
| 2,841,007 | Loomis | July 1, 1958 |
| 2,850,101 | Johnston et al. | Sept. 2, 1958 |
| 2,868,297 | Lamberson | Jan. 13, 1959 |